(12) United States Patent
Joehnk et al.

(10) Patent No.: US 8,123,087 B2
(45) Date of Patent: Feb. 28, 2012

(54) CONTAINER WITH EXTENDABLE SPOUT

(75) Inventors: Terrence Joehnk, Portland, OR (US); Scott C. Holt, Portland, OR (US); Timothy A. Clark, Durham, OR (US)

(73) Assignee: NIKE, Inc., Beaverton, OR (US)

( * ) Notice: Subject to any disclaimer, the term of this patent is extended or adjusted under 35 U.S.C. 154(b) by 881 days.

(21) Appl. No.: 12/176,552

(22) Filed: Jul. 21, 2008

(65) Prior Publication Data

US 2010/0012686 A1   Jan. 21, 2010

(51) Int. Cl.
*B67D 3/00* (2006.01)
(52) U.S. Cl. .......................... 222/525; 264/294
(58) Field of Classification Search .......... 222/522–525; 264/294; 220/716–718, 704, 703; 251/353, 251/354
See application file for complete search history.

(56) References Cited

U.S. PATENT DOCUMENTS

| | | | | |
|---|---|---|---|---|
| 716,257 A * | 12/1902 | Lunt | ............................. | 222/522 |
| 1,471,868 A * | 10/1923 | Swartz | ........................... | 222/420 |
| 2,516,040 A * | 7/1950 | Zumdahl | ....................... | 222/490 |
| 2,569,139 A * | 9/1951 | Abelson | ....................... | 215/11.1 |
| 3,197,089 A * | 7/1965 | Michael | ........................ | 222/479 |
| 4,403,709 A * | 9/1983 | Meins et al. | ................... | 220/703 |
| 4,679,702 A * | 7/1987 | Maccarone et al. | ........... | 220/717 |
| 4,997,112 A | 3/1991 | Eicher | | |
| 5,145,094 A * | 9/1992 | Perlmutter | ............... | 222/153.14 |
| 5,230,442 A | 7/1993 | Dean, Jr. | | |
| 5,285,933 A * | 2/1994 | Gentes et al. | ................ | 222/148 |
| 5,337,931 A * | 8/1994 | Kitterman | ..................... | 222/525 |
| 5,607,086 A | 3/1997 | Gooch | | |
| 6,450,358 B1 * | 9/2002 | Berro | .......................... | 220/258.2 |
| 2003/0168474 A1 * | 9/2003 | Widgery | ....................... | 222/183 |
| 2007/0051727 A1 * | 3/2007 | Holley | ......................... | 220/367.1 |

* cited by examiner

*Primary Examiner* — Kevin P Shaver
*Assistant Examiner* — Donnell Long
(74) *Attorney, Agent, or Firm* — Plumsea Law Group, LLC

(57) ABSTRACT

A fluid container may have a body that defines a void for receiving a fluid. A neck extends outward from the body, and a spout the spout is at least partially located within the neck. The spout is movable between a retracted position and an extended position. When the spout is in the retracted position, a majority of the spout is located within the neck and the fluid is prevented from flowing out of the container through the spout. When the spout is in the extended position, however, the spout extends outward from the neck and the fluid is free to flow out of the container through the spout. An exterior surface of the spout may be at least partially formed from a deformable material, and a protrusion in the neck contacts the material and extends into the material to form a seal.

25 Claims, 12 Drawing Sheets

CONTAINER WITH EXTENDABLE SPOUT

BACKGROUND

While participating in athletic activities, whether competition or training, athletes may perspire to assist with cooling of the body. Relatively small hydration losses through perspiration have the potential to impair athletic performance by accelerating the onset of fatigue. In order to offset hydration losses due to perspiration, many athletes consume water or other fluids while engaging in the athletic activities.

A variety of containers for holding and dispensing the fluids are available to athletes. A conventional container has a two-part body that includes a receptacle portion and a cap portion joined through a threaded coupling (e.g., for filling the containers with fluid). A neck may extend from the cap portion. In some containers, a secondary cap is removable from the neck (e.g., through a treaded coupling) to permit the athlete to consume fluid from the container. In other containers, the spout is movable to permit the athlete the alternately consume fluid from the container and seal the fluid within the container.

SUMMARY

A fluid container is disclosed below. The fluid container has a body that defines an interior void for receiving a fluid. A neck extends outward from the body, and a spout is at least partially located within the neck. The spout is movable between a retracted position and an extended position. When the spout is in the retracted position, a majority of the spout is located within the neck and the fluid is prevented from flowing out of the container through the spout. When the spout is in the extended position, however, the spout extends outward from the neck and the fluid is free to flow out of the container through the spout. In some configurations, an exterior surface of the spout is at least partially formed from a deformable material, and a protrusion in the neck contacts the material and extends into the material to form a seal.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

Figure 1:
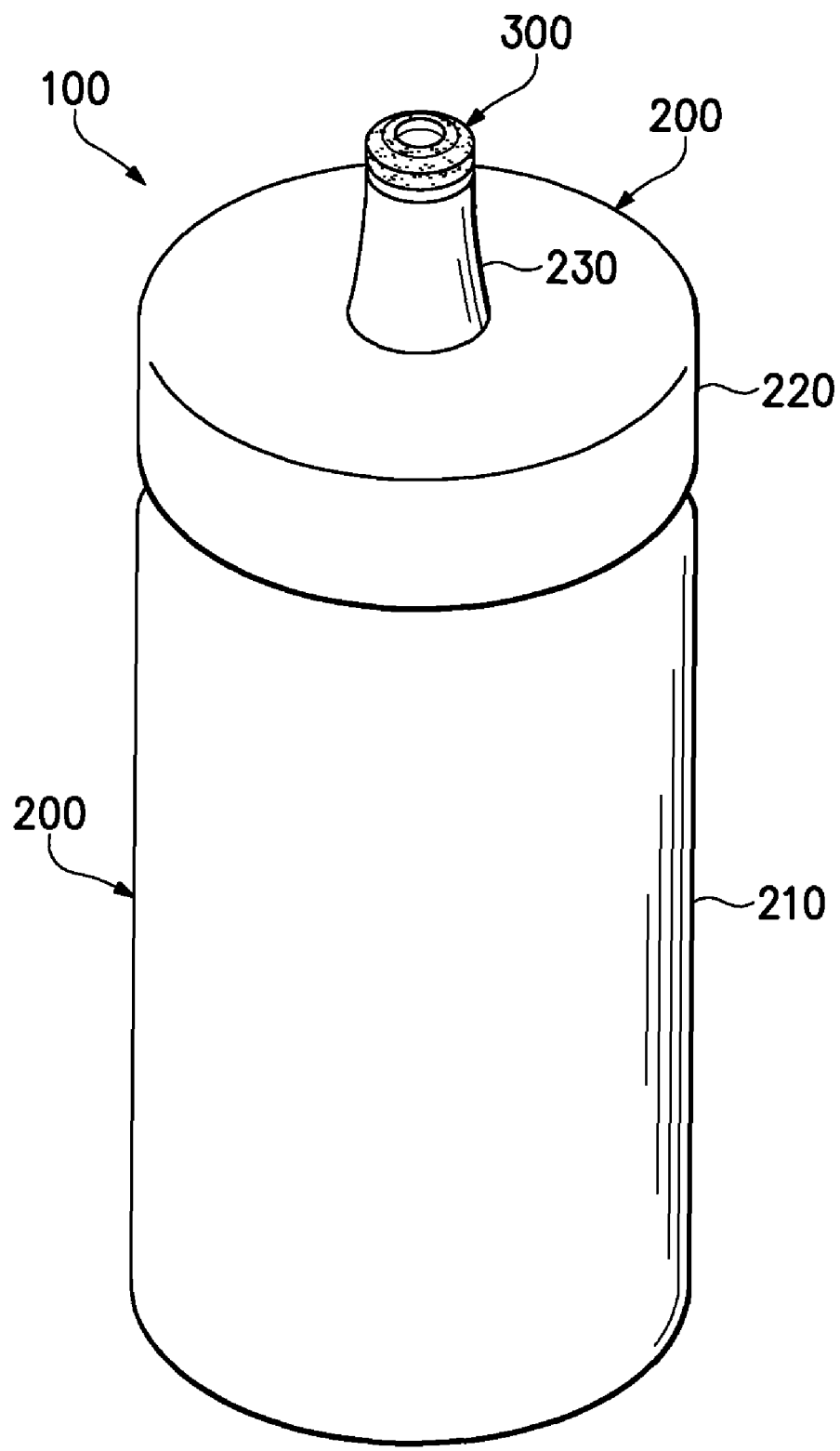
FIG. 1 is a perspective view of a container having a movable spout.
Figure 2:
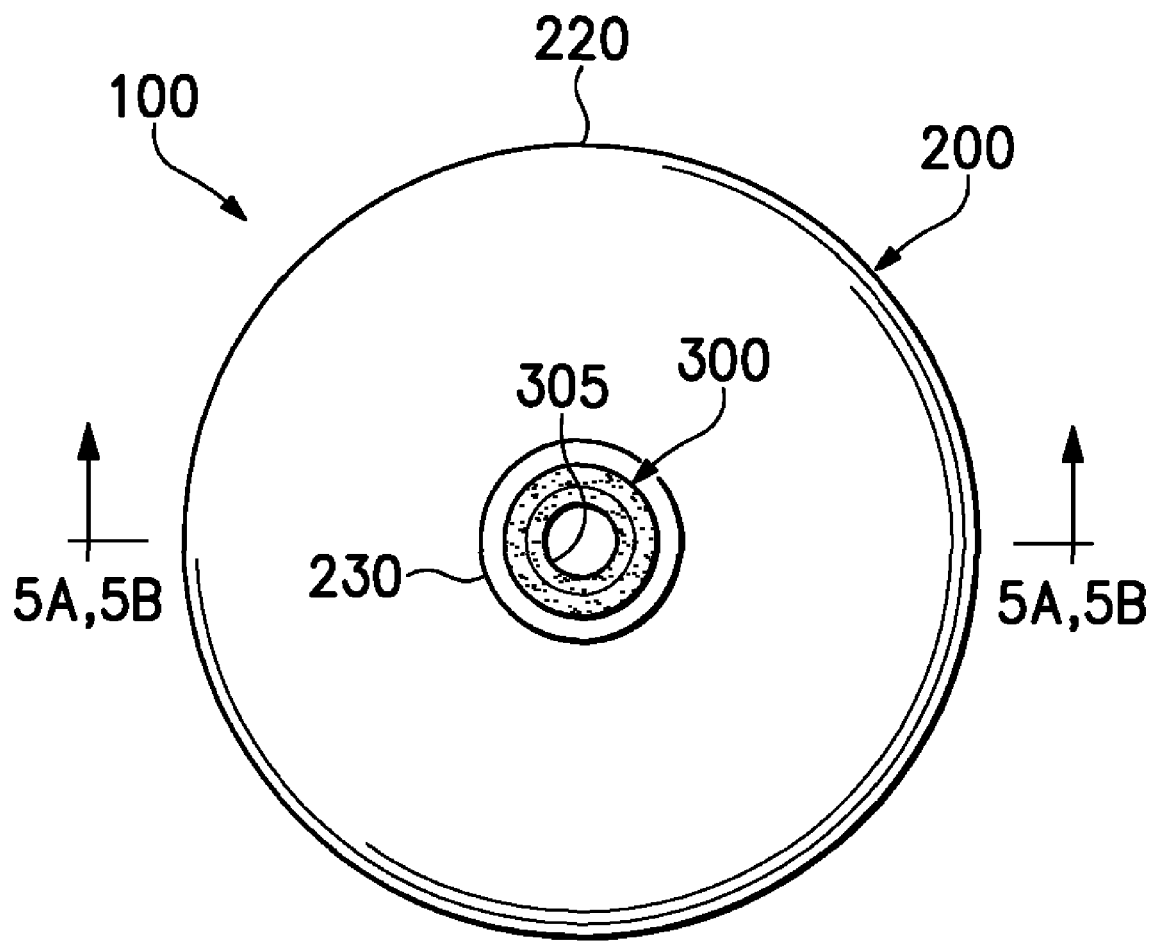
FIG. 2 is a top plan view of the container.
Figure 3:
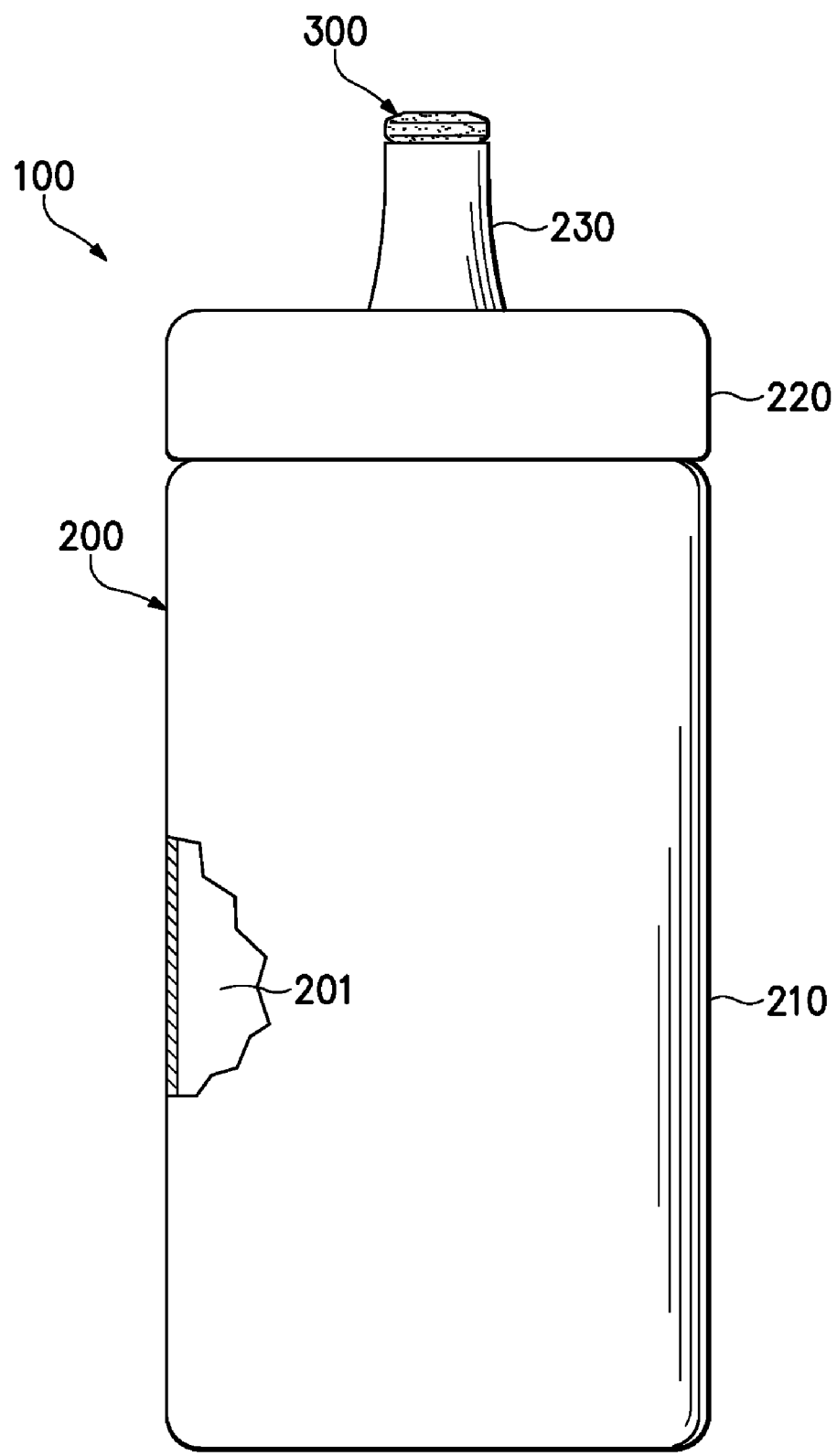
FIG. 3 is a first side elevational view of the container depicting the spout in a retracted position.
Figure 4:
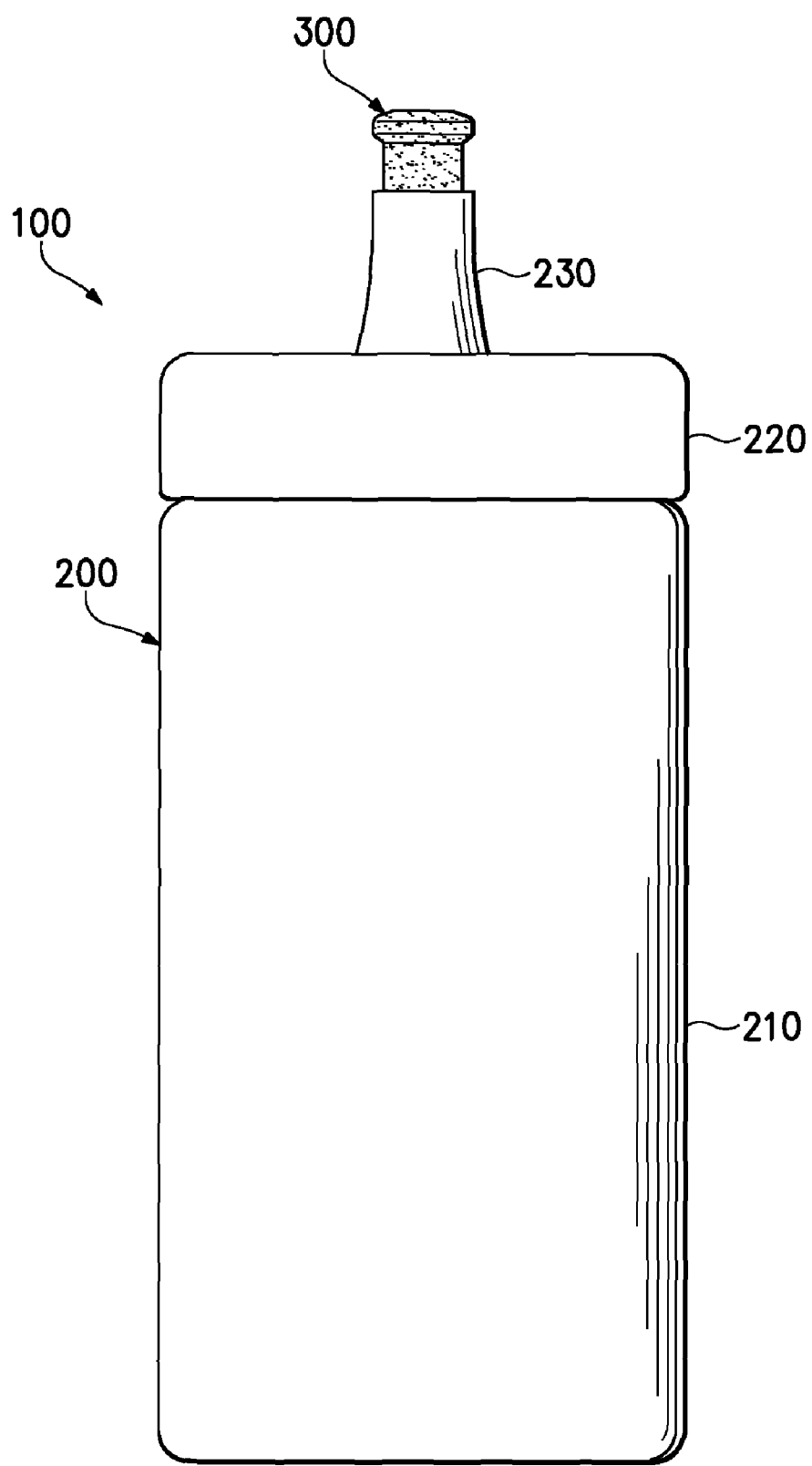
FIG. 4 is a second side elevational view of the container depicting the spout in an extended position.

The following discussion and accompanying figures disclose various configurations of a fluid container having an extendable or otherwise movable spout.

A fluid container 100 is depicted in FIGS. 1-6 as including a body 200 and a spout 300. In general, body 200 has a configuration that holds or otherwise contains a fluid (e.g., water), and spout 300 is at least partially located within body 200 and movable between a retracted position (see FIGS. 3 and 5A) and an extended position (see FIGS. 4 and 5B). When spout 300 is in the retracted position, a majority of spout 300 is located within body 200 and the fluid within body 200 is prevented from flowing out of container 100 through spout 300. When spout 300 is in the extended position, however, spout 300 extends outward from body 200 and the fluid within body 200 is free to flow out of container 100 through spout 300. By moving spout 300 between the retracted position and the extended position, therefore, a user of container 100 may alternately secure the fluid within body 200 and consume, drink, or otherwise use the fluid flowing through spout 300.

Body 200 includes a receptacle portion 210 and a cap portion 220 that cooperatively define an interior void 201 for holding or otherwise containing the fluid. Receptacle portion 210 is depicted as having a generally cylindrical configuration, but may have any practical shape and may also define a handle or other structure that facilitates grasping or otherwise securing container 100. An upper area of receptacle portion 210 includes a series of threads 211 that extend around an opening 212. A lower area of cap portion 220 includes a series of corresponding and mating threads 221 that (a) secure cap portion 220 to the upper area of receptacle portion 210 and over opening 212 and (b) separate cap portion 220 from receptacle portion 210 to provide access to opening 212 (e.g., when filling void 201 with the fluid). A variety of polymer materials may be utilized for body 200, including polycarbonate, high or low density polyethylene, polypropylene, polyester, and polyethyleneterephtalate, for example. Body 200 may also be formed from glass or stainless steel, or portions 210 and 220 may be formed from different materials. In some configurations either of portions 210 and 220 may be formed from two or more materials, as when incorporating high-friction elements to assist with holding container 210.

Figure 5A:
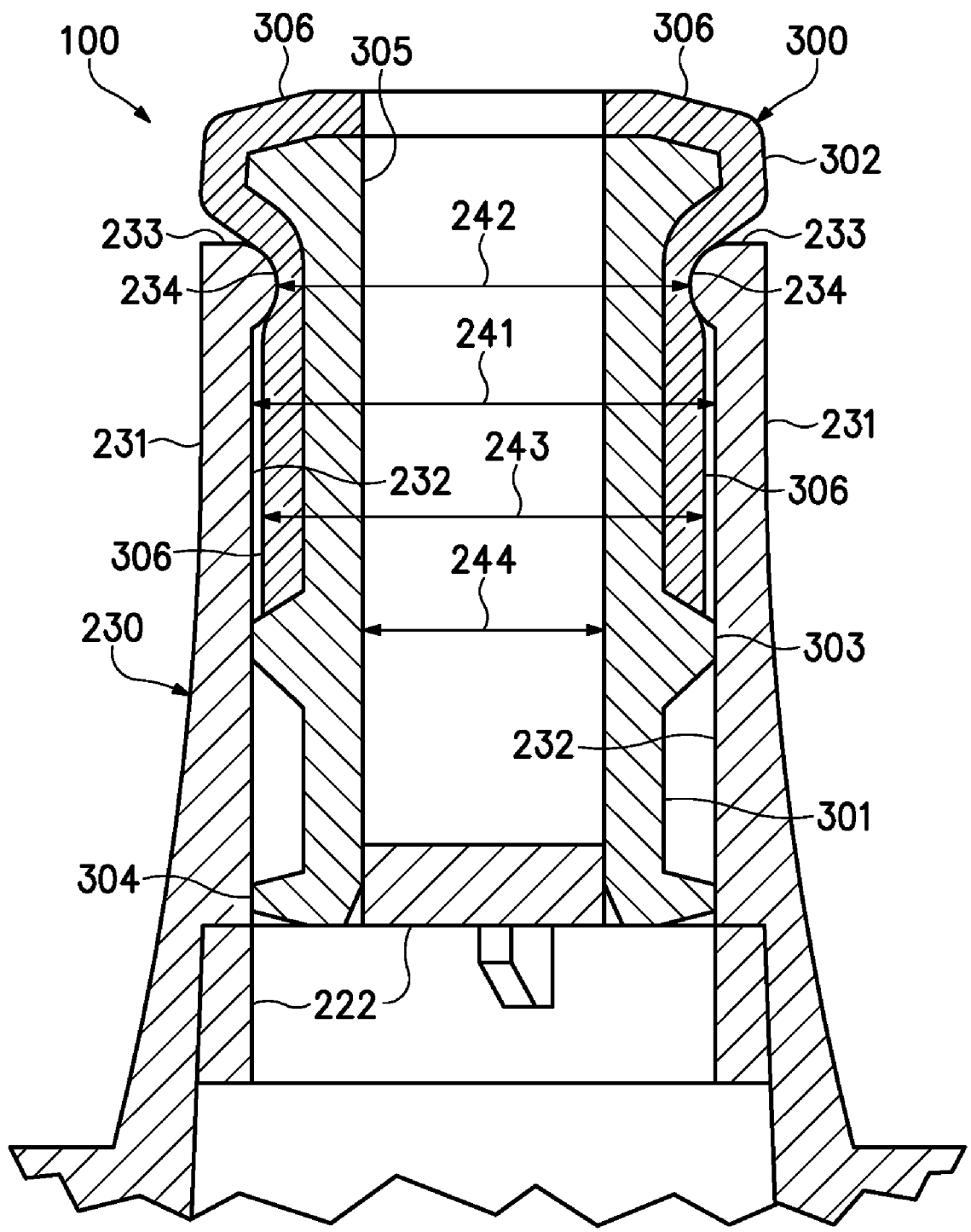
FIGS. 5A and 5B are cross-sectional views of the container, as defined by section line 5A, 5B in FIG. 2, respectively showing the spout in the retracted position and the extended position.
Figure 5B:
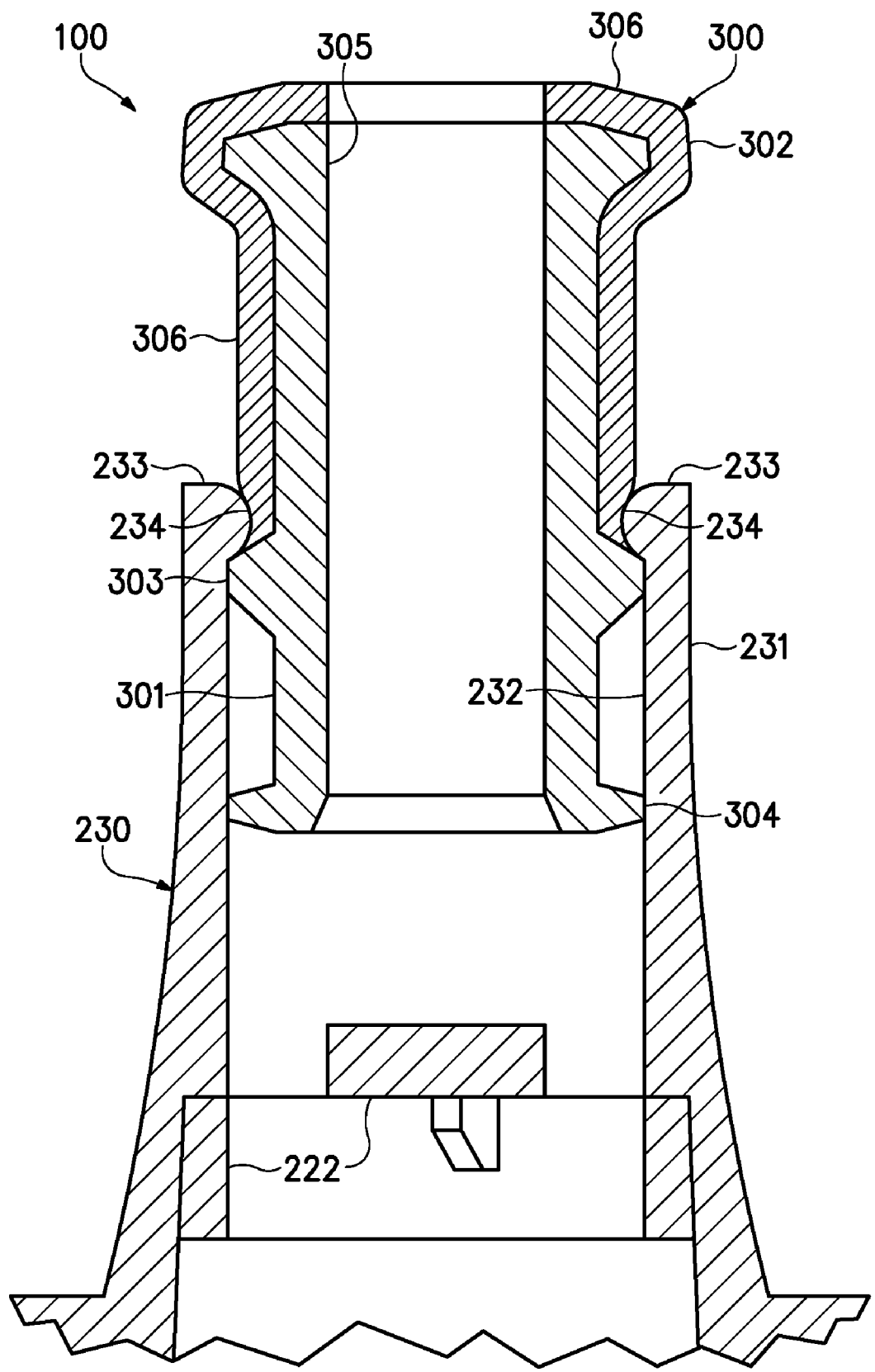
Figure 6:
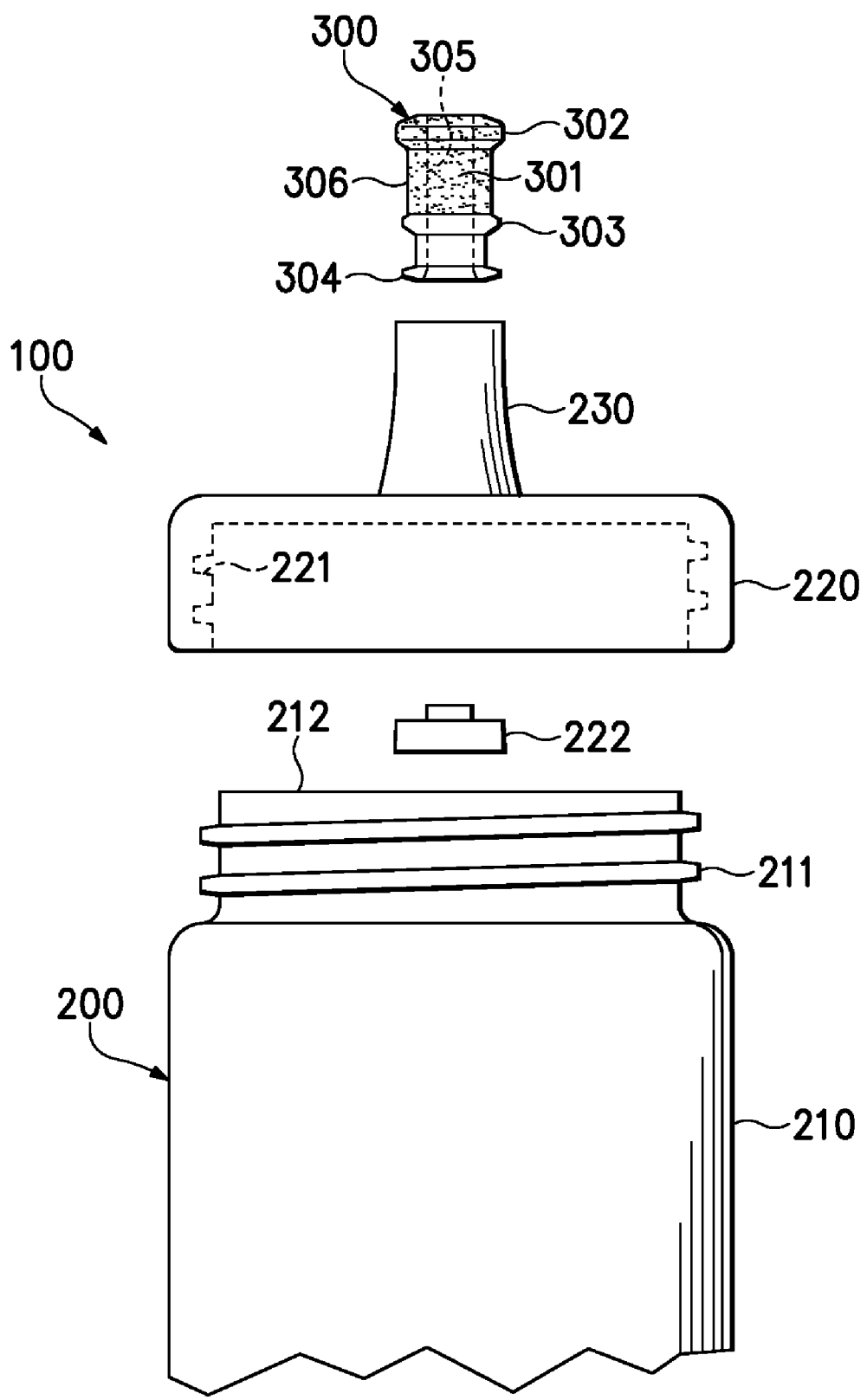
FIG. 6 is an exploded side elevational view of the container.
Figure 7:
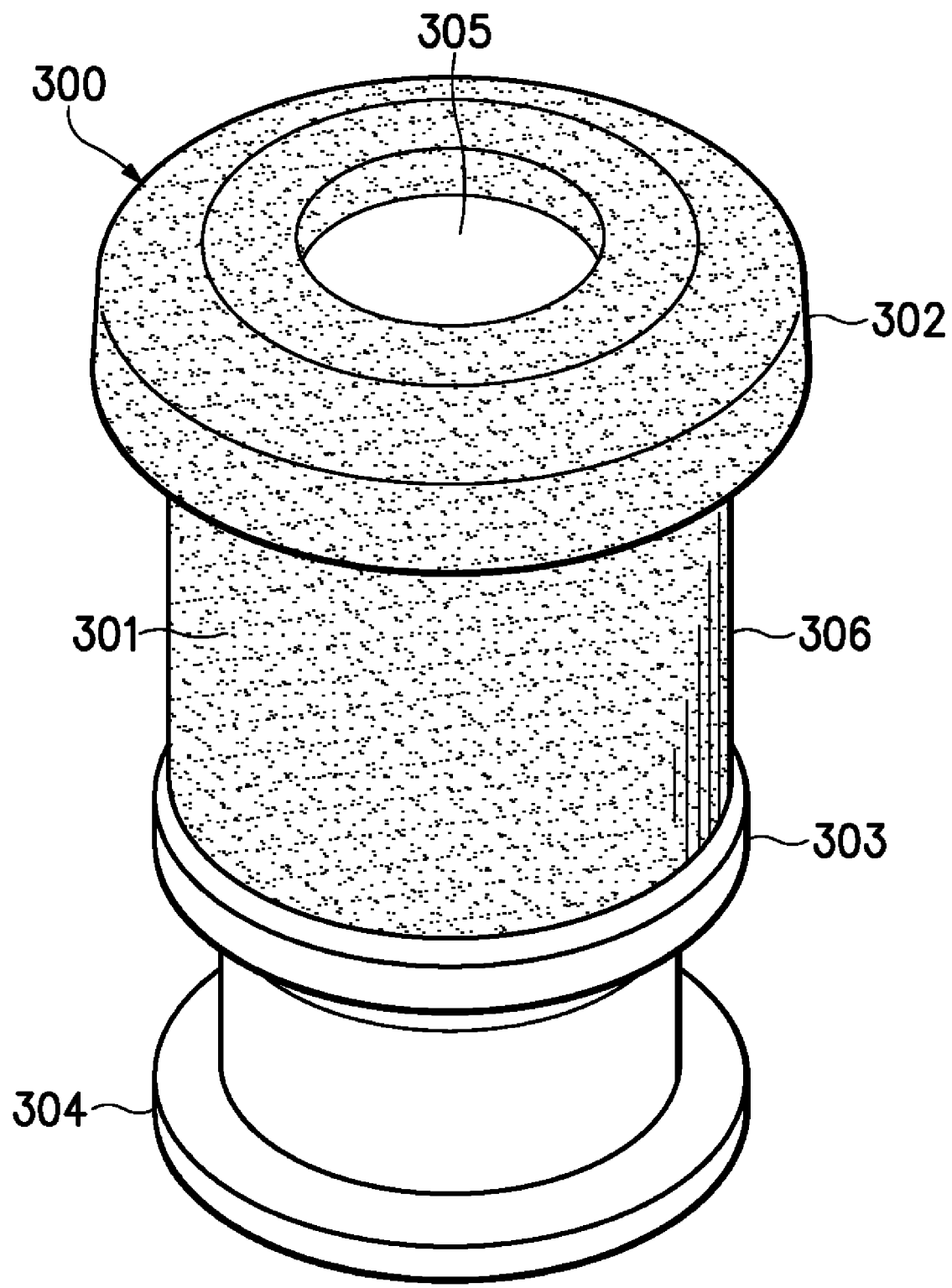
FIG. 7 is a perspective view of the spout.
Figure 8:
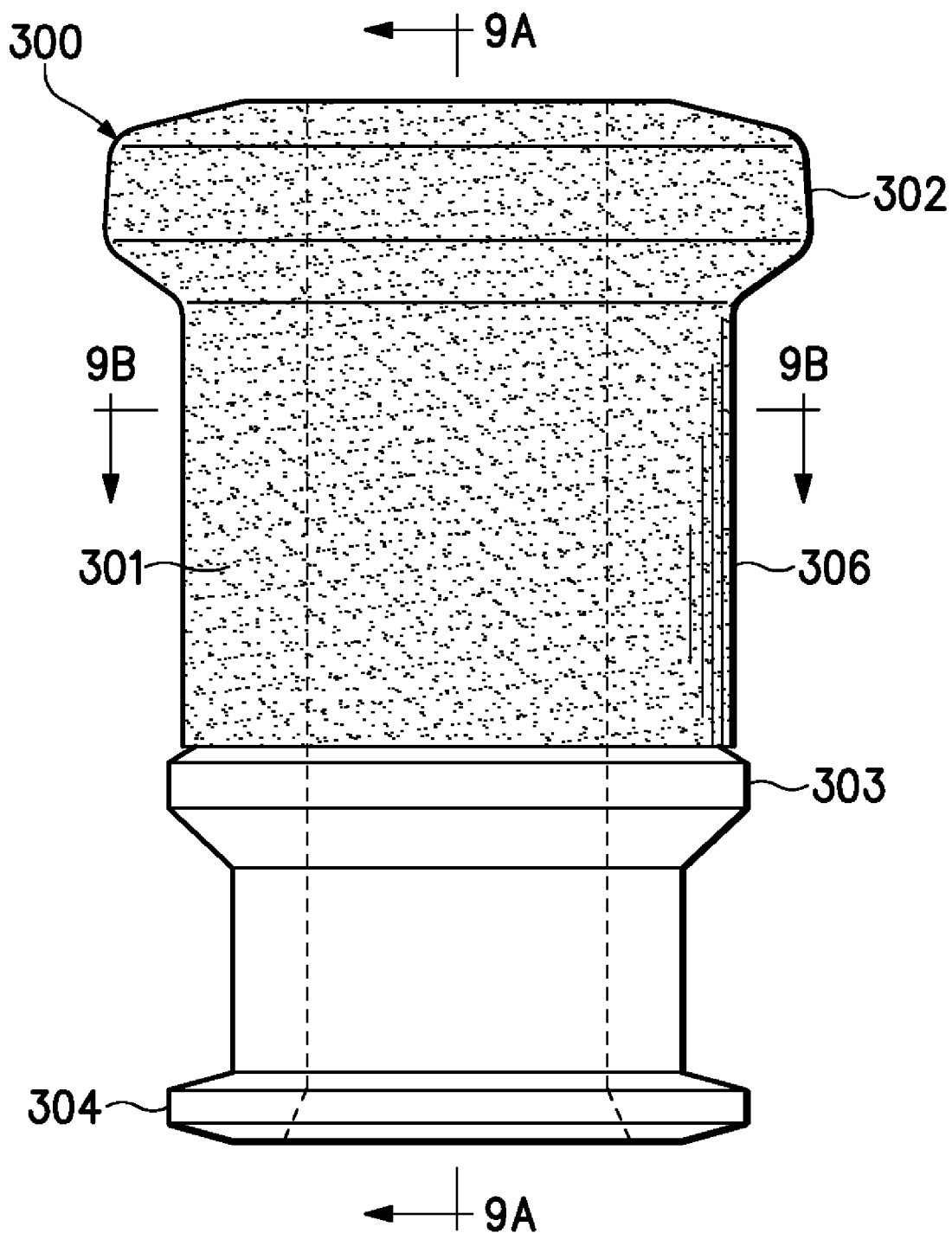
FIG. 8 is a side elevational view of the spout.
Figure 9A:
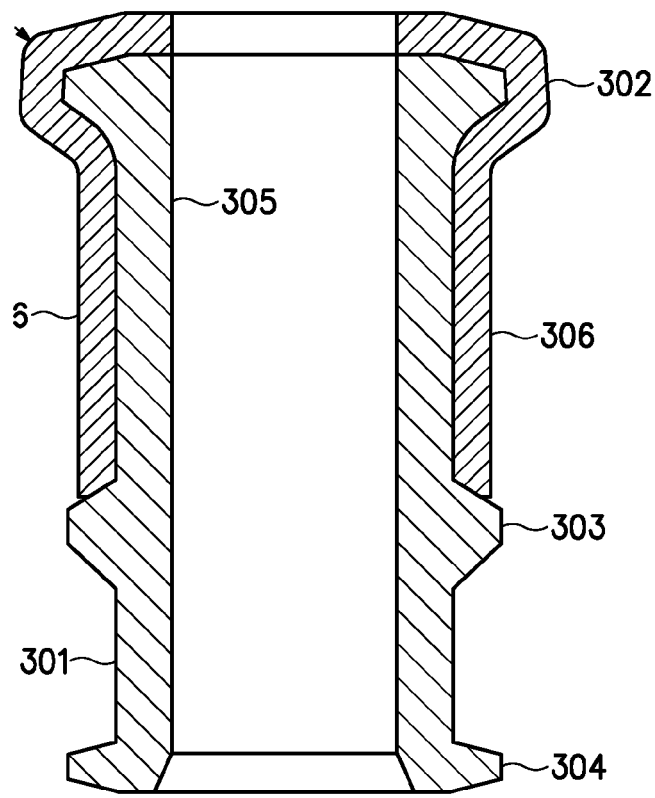
FIGS. 9A and 9B are cross-sectional views of the spout, as defined by section lines 9A and 9B in FIG. 8.
Figure 9B:
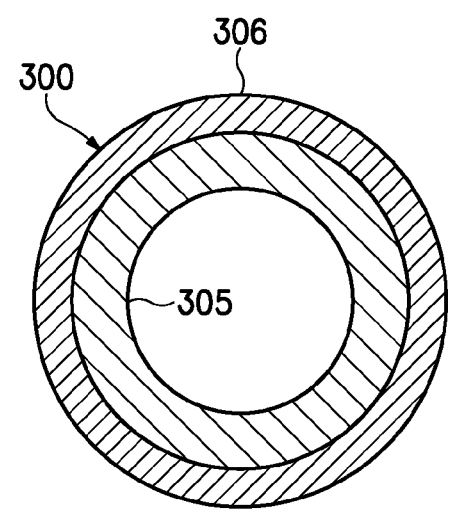

The lower area of cap portion 220 (i.e., adjacent to threads 221) has a diameter that is approximately equal to a diameter of receptacle portion 210. As cap portion 220 extends upward, however, the diameter of cap portion 220 narrows to form a generally cylindrical and hollow neck 230, in which spout 300 is located. Referring to FIGS. 5A and 5B, neck 230 has an exterior surface 231 and an opposite interior surface 232. Exterior surface 231 forms an outer portion of neck 230 and is visible from an exterior of container 100, whereas interior surface 232 forms an inner portion of neck 230 that defines an area for receiving spout 300. An upper-most portion of neck 230 defines a rim 233 that forms an opening into the hollow interior of neck 230. Whereas at least a majority of the portion of interior surface 232 that surrounds spout 300 has a substantially constant diameter, interior surface 232 defines a protrusion 234 adjacent to rim 233. Protrusion 234 circumscribes or otherwise extends around interior surface 232 to form an inwardly-directed and ring-shaped flange located adjacent to (and possibly forming a portion of) rim 233.

A plug element 222 is located in a lower area of neck 230. When spout 300 is in the retracted position (see FIG. 5A), plug element 222 extends into spout 300 to prevent the fluid from flowing out of container 100 through spout 300. When spout 300 is in the extended position (see FIG. 5B), however, plug element 222 is separate and spaced from spout 300 and the fluid within body 200 is free to flow out of container 100 through spout 300. Although the portion of plug element 222 that extends into spout 300 is depicted as having a generally block-like configuration, plug element 222 may have a variety of structures that interface with spout 300 to prevent fluid flow.

Spout 300 is located within neck 230 and exhibits a generally elongate and rounded configuration. As depicted in FIGS. 7-9B, an exterior surface 301 of spout 300 has a generally cylindrical configuration defining three protrusions 302-304 that circumscribe or otherwise extend around spout 300, thereby forming outwardly-directed and ring-shaped flanges on exterior surface 301. Protrusion 302 is located at an upper area of spout 300 and positioned to be outside of neck 230. Protrusion 303 is located in a central area of spout 300 and positioned within neck 230. Protrusion 304 is located in a lower area of spout 300 and also positioned within neck 230. As discussed above, protrusion 234 of neck 230 extends around interior surface 232 and is adjacent to rim 233. Protrusion 234 is positioned between protrusions 302 and 303. When spout 300 is in the retracted position, protrusion 234 is located adjacent to and may be in contact with protrusion 302 of spout 300. When spout 300 is in the extended position, however, protrusion 234 is located adjacent to and may be in contact with protrusion 303 of spout 300. Accordingly, the relative positions of protrusion 234 and protrusions 302 and 303 changes as spout 300 is moved between the retracted and extended positions.

A channel 305 extends through spout 300 and along a longitudinal axis of spout 300. When spout 300 is in the retracted position, plug element 222 is located within a lower area of channel 305 to prevent fluid flow. When spout 300 is in the extended position, however, plug element 222 is spaced from the lower area of channel 305 and permits the fluid to flow through channel 301.

Spout 300 also includes a covering 306 that forms a portion of exterior surface 301. Covering 306 is depicted as wrapping over protrusion 302 and extending downward to protrusion 303. In other configurations, covering 306 may extend downward to protrusion 304 or may be absent from the surface of protrusion 302. Given the presence of covering 306, spout 300 is formed from two different materials. More particularly, whereas covering 306 is formed from a relatively soft, compressible, or otherwise compliant material, a remainder of spout 300 is formed from a material that has lesser softness (i.e., greater hardness), compressibility, and compliance. Suitable materials for covering 306 include rubber, silicone, or relatively soft formulations of polycarbonate, high or low density polyethylene, polypropylene, polyester, and polyethyleneterephtalate, for example. The remainder of spout 300 may be formed from any of the materials disclosed above for body 200 and may also be formed from the same material as body 200.

Although plug element 222 prevents the fluid from flowing out of container 100 through spout 300 when spout 300 is in the retracted position, the fluid may enter a portion of the area between spout 300 and neck 230 whether spout 300 is in the retracted position or the extended position. In order to prevent the fluid from exiting container 100 from the area between spout 300 and neck 230, protrusion 234 extends around and into an entire circumference of exterior surface 301, thereby forming a seal with covering 306. That is, a portion of interior surface 232 (i.e., protrusion 234) contacts spout 300 and extends into a portion of exterior surface 301 formed by covering 306. By compressing and deforming the material of covering 306, a seal is formed between protrusion 234 and spout 300 that prevents the fluid from exiting container 100 from the area between spout 300 and neck 230. Given that the material forming neck 230 and protrusion 234 may have greater hardness than the material of covering 306, the material of protrusion 234 extends into and deforms the material of covering 306.

Referring to the cross-sections of FIGS. 5A and 5B, various diameters 241-244 are identified. Diameter 241 extends across neck 230 and defines a diameter of a majority of interior surface 232. Diameter 242 extends across neck 230 and defines a diameter of inward-facing portions of protrusion 234. Diameter 243 extends across spout 300 and defines a diameter of exterior surface 301 in the area between protrusions 302 and 303 and formed by covering 306. Similarly, diameter 244 extends across spout 300 and defines a diameter of channel 305. A length of diameter 241 is greater than lengths of each of diameters 242-244. The length of diameter 242 is less than each of the lengths of diameters 241 and 243, but greater than the length of diameter 244. The length of diameter 243 is less than the length of diameter 241, but greater than the lengths of each of diameters 242 and 244. Similarly, the length of diameter 244 is less than the lengths of each of diameters 241-243.

Given the positions and relative lengths of diameters 242 and 243, the manner in which the seal is formed when protrusion 234 extends around and into covering 306 may be determined. More particularly, the diameter across protrusion 234 (i.e., diameter 242) is less than the diameter of covering 306 (i.e., diameter 243). In this configuration, protrusion 234 contacts spout 300 and extends into a portion of exterior surface 301 formed by covering 306, thereby forming the seal between protrusion 234 and spout 300 and preventing the fluid from exiting container 100 from the area between spout 300 and neck 230.

The seal formed between protrusion 234 and covering 306 is present whether spout 300 is in the retracted position or in the extended position. As noted above, covering 306 wraps over protrusion 302 and extends downward to protrusion 303, and protrusion 234 is positioned between protrusions 302 and 303. When spout 300 is in the retracted position, protrusion 234 is located adjacent to protrusion 302 and is in a location where the seal may be formed with covering 306. When spout 300 is in the extended position, however, protrusion 234 is located adjacent to protrusion 303 and is also in a location where the seal may be formed with covering 306. Accordingly, protrusion 234 contacts spout 300 in different locations when in the retracted and extended positions, but protrusion 234 may form the seal with covering 306 in either of these locations.

The configuration of container 100 disclosed above is suitable for holding water or other fluids that are intended to be consumed by an individual. More specifically, and as an example, container 100 may be utilized by American football players to consume fluids when wearing a helmet. Neck 230 has a generally narrow configuration that may fit between portions of a faceguard on a conventional helmet. When in the extended position, spout 300 extends outward from neck 230 and effectively increases the length of neck 230. Given the increased length, football players may consume the fluid within container 100 even when wearing a conventional helmet.

In manufacturing container 100, the interior portion of spout 300 may be initially formed through a first molding operation. Covering 306 may then be formed through a second molding operation that overmolds covering 306 onto the interior portion of spout 300. As alternatives, covering 306 may be sprayed onto the interior portion of spout 300 or the two portions of spout 300 may be co-molded through a single molding operation. Once spout 300 is formed, spout 300 may be inserted into neck 230 such that protrusion 234 (a) is positioned between protrusions 302 and 303 and (b) extends into and deforms a portion of covering 306 to form the seal.

Figure 10:
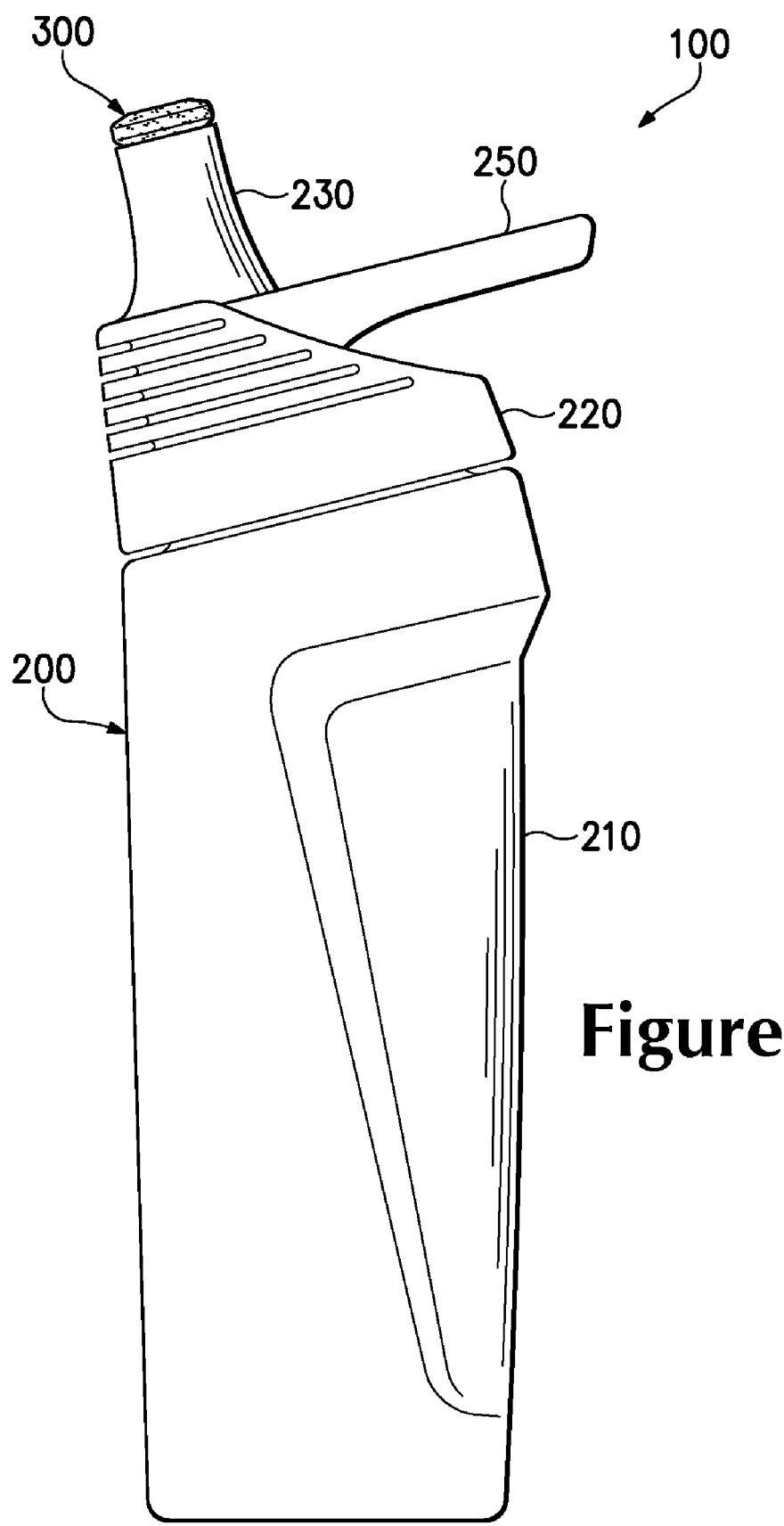
FIG. 10 is a side elevational view of another configuration of the container.
Figure 11:
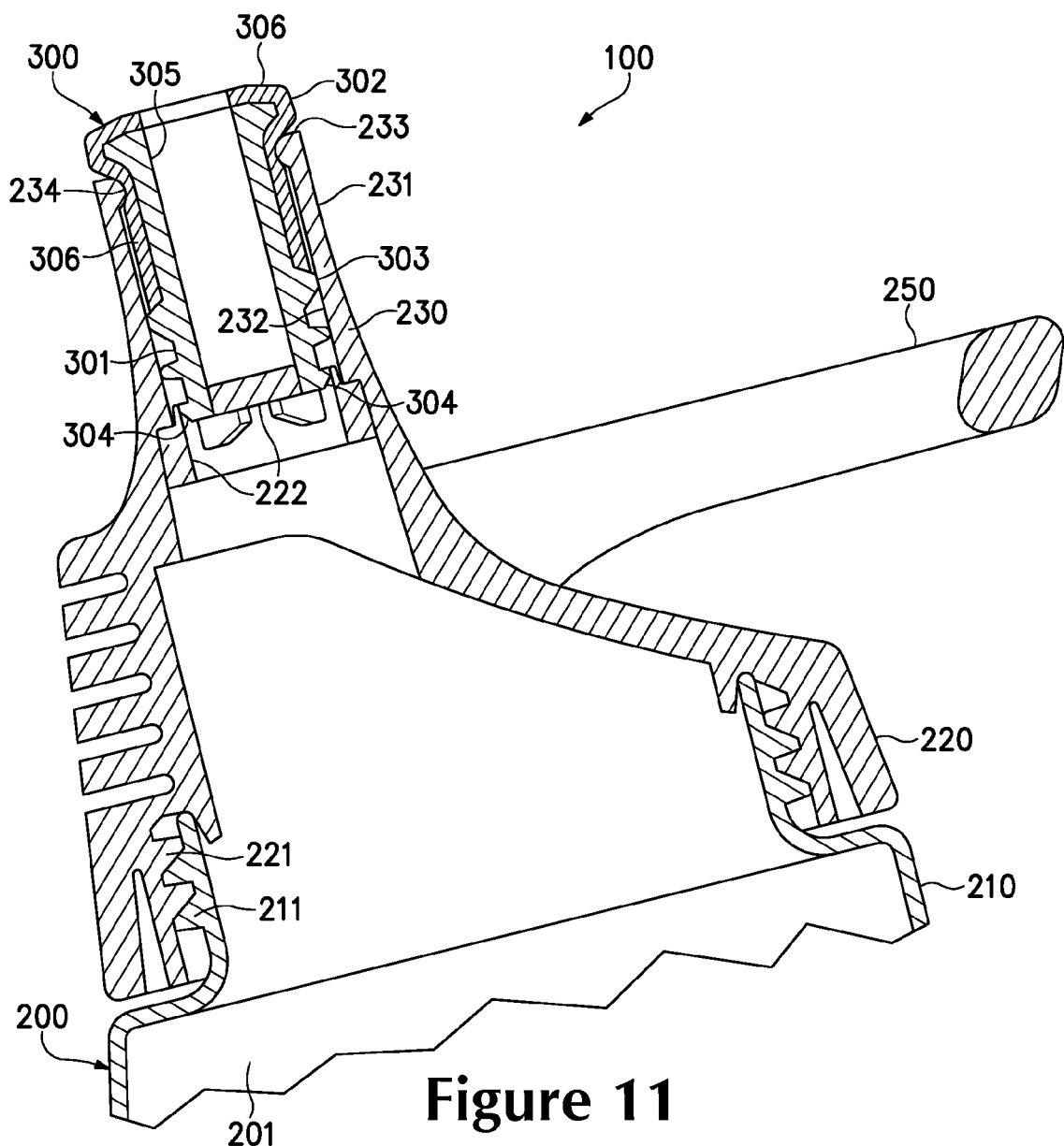
FIG. 11 is a cross-sectional view of the container depicted in FIG. 10.

The configuration of container 100 depicted in FIGS. 1-6 provides an example of a suitable configuration for container 100, but various aspects relating to the design of container 100 may vary considerably. Referring to FIGS. 10 and 11, another configuration of container 100 is depicted, in which cap portion 220 and neck 230 are angled relative to vertical and cap portion 220 forms a handle 250. Although container 100 has a configuration that is suitable for holding water or other fluids that are intended to be consumed by an individual, container 100 may also be utilized to hold a variety of fluids that are utilized for various purposes. More particularly, concepts associated with neck 230 and spout 300 may be incorporated into containers for holding or dispensing gasoline or oil, for example. Accordingly, various aspects relating to container 100 may be modified or utilized for purposes other than providing fluid to an individual.

A further difference in the configuration of FIGS. 10 and 11 relates to plug element 222. Referring to FIG. 5A, plug element 222 has a configuration that extends into channel 305 in order to prevent the fluid from entering channel 305. The fluid may, however, pass around a portion of exterior surface 301, but is generally prevented from exiting container 100 by the interface between protrusion 234 and covering 306. In contrast, FIG. 11 depicts a configuration wherein plug element also interfaces with a lower portion of exterior surface 301 (i.e., protrusion 304) to form a secondary seal that prevents the fluid from exiting container 100.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A fluid container comprising:
 a body that defines an interior void for receiving a fluid;
 a neck extending outward from the body, the neck at least partially formed from a first material and having an interior surface; and
 a spout at least partially located within the neck, the spout having an exterior surface located adjacent to the interior surface, and the spout defining a channel spaced inward from the exterior surface, the exterior surface being at least partially formed from a second material, a hardness of the second material being less than a hardness of the first material,
wherein at least a portion of the interior surface of the neck contacts the spout and extends into the exterior surface to deform the second material, and wherein the channel is at least partially formed from a third material, a hardness of the second material being less than a hardness of the third material.

2. The fluid container recited in claim 1, wherein the first material and the third material are substantially identical materials.

3. The fluid container recited in claim 1, wherein the portion of the interior surface that contacts the spout is a protrusion that extends entirely around the spout.

4. The fluid container recited in claim 1, wherein the spout is movable from a retracted position to an extended position, a majority of the spout being located within the neck in the retracted position, and at least a portion of the spout being located outside of the neck in the extended position.

5. A fluid container comprising:
 a body that defines an interior void for receiving a fluid;
 a neck extending outward from the body, the neck having an exterior neck surface and an opposite interior neck surface, the exterior neck surface defining at least a portion of an exterior of the container, and the interior neck surface defining a protrusion; and
 a spout at least partially located within the neck, the spout having an exterior spout surface and an opposite interior spout surface, the exterior spout surface being located adjacent to the interior neck surface, and the interior spout surface defining a channel extending along a longitudinal axis of the spout, the spout being at least partially formed from:
  a first material located to define at least a portion of the interior spout surface, and
  a second material located to define at least a portion of the exterior spout surface, a hardness of the second material being less than a hardness of the first material,
wherein the protrusion contacts the spout and extends into the exterior spout surface to deform the second material.

6. The fluid container recited in claim 5, wherein the protrusion extends entirely around the interior neck surface, and the protrusion extends into an entire circumference of the exterior spout surface.

7. The fluid container recited in claim 6, wherein an end of the protrusion defines a first diameter, and the exterior spout surface defines a second diameter, the first diameter being less than the second diameter.

8. The fluid container recited in claim 5, wherein the exterior spout surface defines a first protrusion and a second protrusion, the first protrusion being located outside of the neck, and the second protrusion being located within the neck, the protrusion of the neck being located between the first protrusion and the second protrusion.

9. The fluid container recited in claim 5, wherein at least one of the neck and the body are at least partially formed from the first material 10. The fluid container recited in claim 5, wherein the spout is movable from a retracted position to an extended position, a majority of the spout being located within the neck in the retracted position, and at least a portion of the spout being located outside of the neck in the extended position.

11. The fluid container recited in claim 10, wherein the neck includes a plug element, the channel contacting the plug element while in the retracted position to substantially prevent fluid communication between the interior void and the channel, and the channel being spaced from the plug element while in the extended position to permit fluid communication between the interior void and the channel.

12. The fluid container recited in claim 10, wherein the protrusion contacts a first portion of the exterior spout surface while in the retracted position, and the protrusion contacts a second portion of the exterior spout surface while in the extended position, the first portion of the exterior spout surface being spaced from the second portion of the exterior spout surface.

13. A fluid container comprising:
a body that defines an interior void for receiving a fluid;
a neck extending outward from the body, a portion of the neck defining a cylindrically-shaped interior surface with a first diameter, and the portion of the neck defining an inwardly-extending protrusion that circumscribes the cylindrically-shaped interior surface and has a second diameter, the first diameter being greater than the second diameter; and
a spout at least partially located within the neck, a portion of the spout defining a cylindrically-shaped exterior surface that is positioned adjacent to the cylindrically-shaped interior surface, the cylindrically-shaped exterior surface having a third diameter that is less than the first diameter and greater than the second diameter,
wherein the protrusion contacts and deforms a portion of the cylindrically-shaped exterior surface.

14. The fluid container recited in claim 13, wherein the protrusion is formed from a first material and the cylindrically-shaped exterior surface is formed from a second material, a hardness of the first material being greater than a hardness of the second material.

15. The fluid container recited in claim 14, wherein the spout defines a channel that is spaced inward from the cylindrically-shaped exterior surface, the channel having a surface formed from a third material, a hardness of the third material being greater than a hardness of the second material.

16. The fluid container recited in claim 15, wherein the first material and the third material are substantially identical materials.

17. The fluid container recited in claim 13, wherein the spout is movable from a retracted position to an extended position, a majority of the spout being located within the neck in the retracted position, and at least a portion of the spout being located outside of the neck in the extended position.

18. The fluid container recited in claim 17, wherein the protrusion contacts a first area of the cylindrically-shaped exterior surface while in the retracted position, and the protrusion contacts a second area of the cylindrically-shaped exterior surface while in the extended position, the first portion of the exterior spout surface being spaced from the second portion of the exterior spout surface.

19. The fluid container recited in claim 13, wherein the spout defines a first protrusion and a second protrusion located on opposite sides of the cylindrically-shaped exterior surface, the protrusion of the neck being located between the first protrusion and the second protrusion.

20. A method of manufacturing a fluid container that includes a body for receiving a fluid, a neck extending outward from the body, and a spout at least partially located within the neck, the method comprising:
defining a protrusion that extends around an interior surface of the neck;
forming an interior portion of the spout from a first material and defining a channel through the first material;
forming at least a portion of an exterior portion of the spout from a second material that is different from the first material; and
locating the spout within the neck such that the protrusion contacts and deforms the exterior portion of the spout formed from the second material.

21. The method recited in claim 20, further including a step of selecting the first material to have a greater hardness than the second material.

22. The method recited in claim 20, wherein the step of forming the exterior portion of the spout including overmolding the second material onto the interior portion of the spout.

23. A fluid container comprising:
a body that defines an interior void for receiving a fluid;
a neck extending outward from the body, the neck at least partially formed from a first material and having an interior surface; and
a spout at least partially located within the neck, the spout having an exterior surface located adjacent to the interior surface, and the spout defining a channel spaced inward from the exterior surface, the exterior surface being at least partially formed from a second material, a hardness of the second material being less than a hardness of the first material,
wherein (a) at least a portion of the interior surface of the neck contacts the spout and extends into the exterior surface to deform the second material, (b) the spout is movable from a retracted position to an extended position, a majority of the spout being located within the neck in the retracted position, and at least a portion of the spout being located outside of the neck in the extended position, and (c) the neck includes a plug element, the channel contacting the plug element while in the retracted position to substantially prevent fluid communication between the interior void and the channel, and the channel being spaced from the plug element while in the extended position to permit fluid communication between the interior void and the channel.

24. The fluid container recited in claim 23, wherein the portion of the interior surface that contacts the spout is a protrusion that extends entirely around the spout.

25. The fluid container recited in claim 23, wherein the portion of the interior surface that contacts the spout is a protrusion that extends entirely around the spout, the protrusion contacting a first portion of the exterior surface while in the retracted position, and the protrusion contacting a second portion of the exterior surface while in the extended position, the first portion of the exterior surface being spaced from the second portion of the exterior surface.

* * * * *